United States Patent
Hsu et al.

(10) Patent No.: US 9,619,409 B2
(45) Date of Patent: Apr. 11, 2017

(54) DATA SAMPLING ALIGNMENT METHOD FOR MEMORY INFERFACE

(71) Applicant: Taiwan Semiconductor Manufacturing Co., Ltd., Hsin-Chu (TW)

(72) Inventors: Ying-Yu Hsu, Hsinchu (TW); Chien-Chun Tsai, Jhudong Township (TW); Wen-Hung Huang, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 432 days.

(21) Appl. No.: 13/736,195

(22) Filed: Jan. 8, 2013

(65) Prior Publication Data
US 2014/0195728 A1   Jul. 10, 2014

(51) Int. Cl.
| G06F 12/00 | (2006.01) |
| G06F 13/16 | (2006.01) |
| G06F 12/02 | (2006.01) |

(52) U.S. Cl.
CPC ...... G06F 13/1689 (2013.01); G06F 12/0246 (2013.01)

(58) Field of Classification Search
CPC .......................... G06F 12/0246; G06F 13/1689
USPC .................................................. 711/105, 154
See application file for complete search history.

(56) References Cited

U.S. PATENT DOCUMENTS

| 2009/0006776 A1 | 1/2009 | Spry et al. |
| 2010/0188910 A1* | 7/2010 | Kizer ................... G11C 7/1051 365/193 |

OTHER PUBLICATIONS

Bhatti, et al. "Data Strobe Timing of DDR2 Using a Statistical Random Sampling Technique." Circuits and Systems, 2007. MWSCAS 2007. 50th Midwest Symposium, pp. 1114-1117, Aug. 5-8, 2007. 4 Pages.

* cited by examiner

*Primary Examiner* — Matthew Bradley
(74) *Attorney, Agent, or Firm* — Eschweiler & Potashnik, LLC

(57) ABSTRACT

The present disclosure relates to an interface comprising a memory controller and a memory unit coupled to the memory controller and configured to communicate with the memory controller through a first signal and a second signal. The interface further comprises a determination unit comprising judgment logic configured to send a control signal configured to align the first signal with the second signal. The memory controller further comprises a digitally-controlled delay line (DCDL) coupled to the determination unit and configured to receive the control signal, wherein the determination unit instructs the DCDL to adjust a delay of the first signal to align the first signal with the second signal. The memory controller further comprises a value register configured to store a signal delay value corresponding to alignment between the first signal with the second signal which is contained within the control signal. Other devices and methods are disclosed.

20 Claims, 9 Drawing Sheets

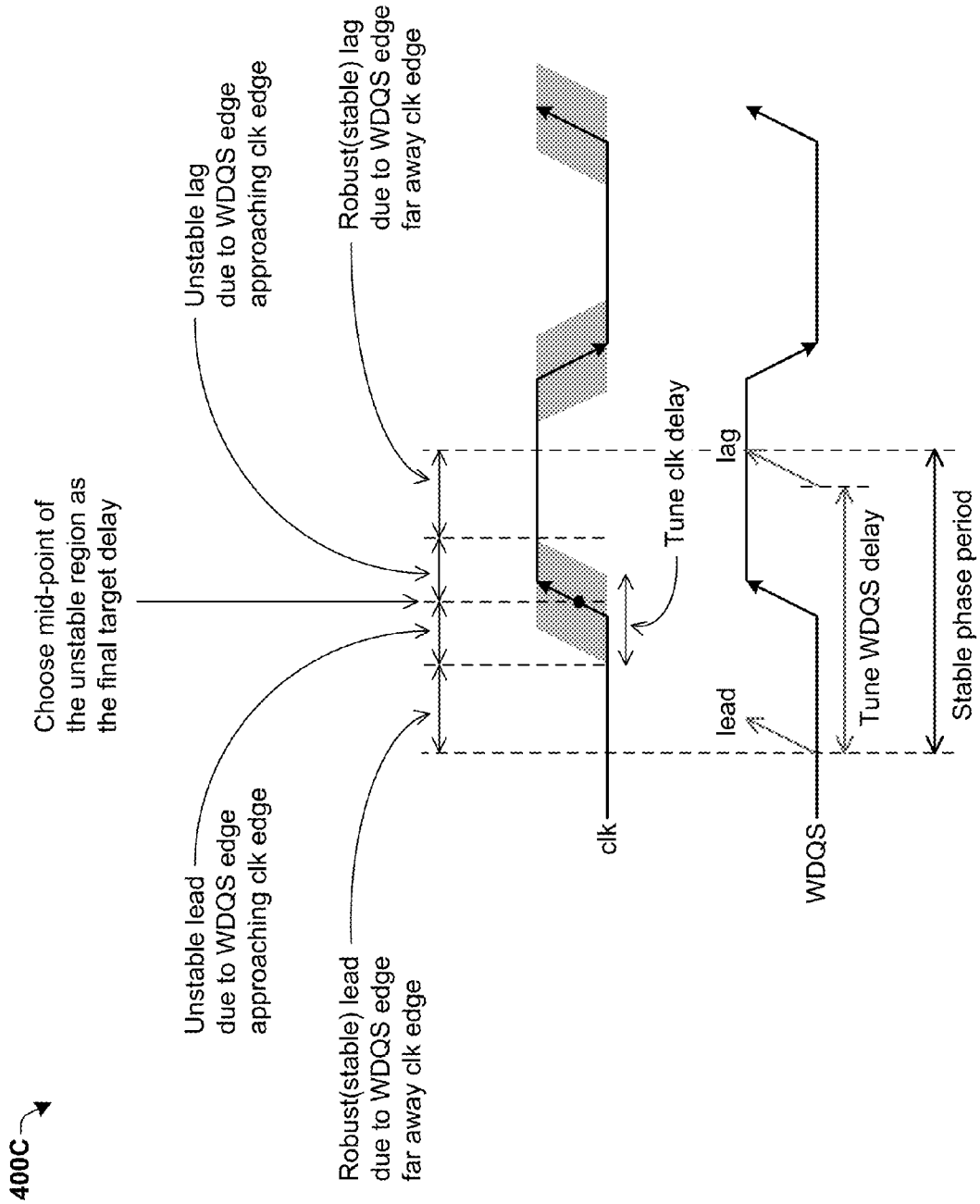

DATA SAMPLING ALIGNMENT METHOD FOR MEMORY INFERFACE

BACKGROUND

Dynamic random-access memory (DRAM) systems within three-dimensional (3D) chip architectures comprise one or more DRAM cells which communicate with a memory controller by means of a data bus formed within an interface comprising a silicon interposer (SII) or through silicon vias (TSVs). The wider data bus of the 3D chip architecture is subject to increased variation compared to the data bus of a two-dimensional (2D) chip architecture due to routing mismatch within an SII or TSV balance variation due to differing TSV numbers along different paths.

BRIEF DESCRIPTION OF THE DRAWINGS

FIG. 4C illustrates some embodiments of write data strobe (WDQS) vs. system clock (clk) training.

DETAILED DESCRIPTION

Figure 1A:
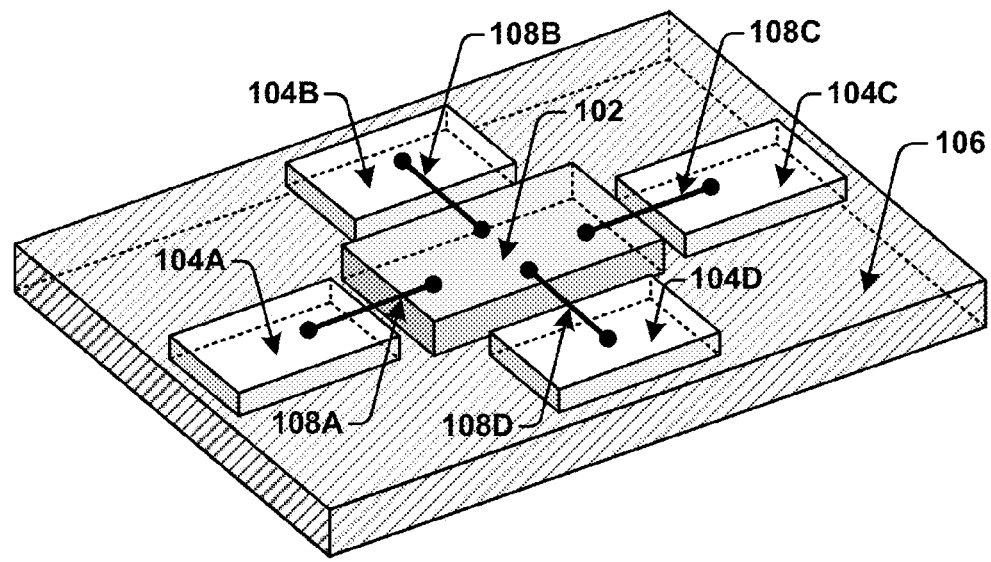
FIGS. 1A-1C illustrate 3D integrated chip architectures and an associated means of data alignment.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one of ordinary skill in the art, that one or more aspects described herein may be practiced with a lesser degree of these specific details. In other instances, known structures and devices are shown in block diagram form to facilitate understanding.

FIG. 1A illustrates a 3D horizontal integrated chip (IC) architecture 100A, comprising a memory controller 102 further comprising an application-specific integrated circuit (ASIC) configured to communicate with a plurality of DRAMs 104A-104D, through first through fourth channels 108A-108D, respectively, disposed within a 3D interface 106 further comprising an SII or TSVs. A respective channel 108A-108D comprises a bidirectional data bus configured to carry 256 bits of data for writing to, or reading from, a respective DRAM 104A-104D. For a 3D manufacturing process, synchronization of timing along the first through fourth channels 108A-108D is made more difficult compared to a chip architecture resulting from a two-dimensional (2D) manufacturing process, wherein an embedded DRAM (eDRAM) and ASIC memory controller are integrated on the same die and communicate through a data bus formed on one or more metallization layers with a thickness of approximately several hundred nanometers. In contrast, a respective data bus (108A-108D) within the 3D horizontal IC architecture 100A comprises a width of approximately several hundred microns. A mismatch mechanism of the 3D horizontal IC architecture 100A results from differing lengths of the first through fourth channels 108A-108D.

Figure 1B:
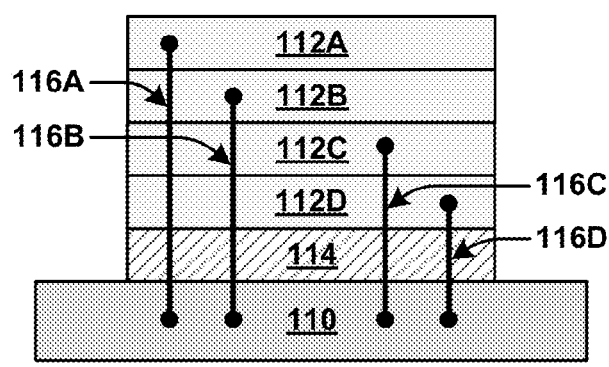

FIG. 1B illustrates a 3D vertical IC architecture 100B, comprising an ASIC memory controller 110 and a plurality of DRAMs 112A-112D mounted vertically above an SII 114. The ASIC memory controller 110 is configured to communicate with the plurality of DRAMs 112A-112D with first through fourth channels 116A-116D, respectively. A respective channel 116A-116D comprises one or more TSVs further comprising a bidirectional data bus configured to carry 256 bits of data for writing to, or reading from, a respective DRAM 112A-112D. A mismatch mechanism of the 3D vertical IC architecture 100B results from differing TSV numbers along different channels 116A-116D.

While the mismatch mechanisms for the 3D horizontal IC architecture 100A and the 3D vertical IC architecture 100B may differ, both rely on a data strobe encoding scheme for data transmission, thus driving a need to calibrate timing paths for communication. Data strobe encoding utilizes two signal lines for each channel: data (DQ) and strobe (DQS).

Figure 1C:
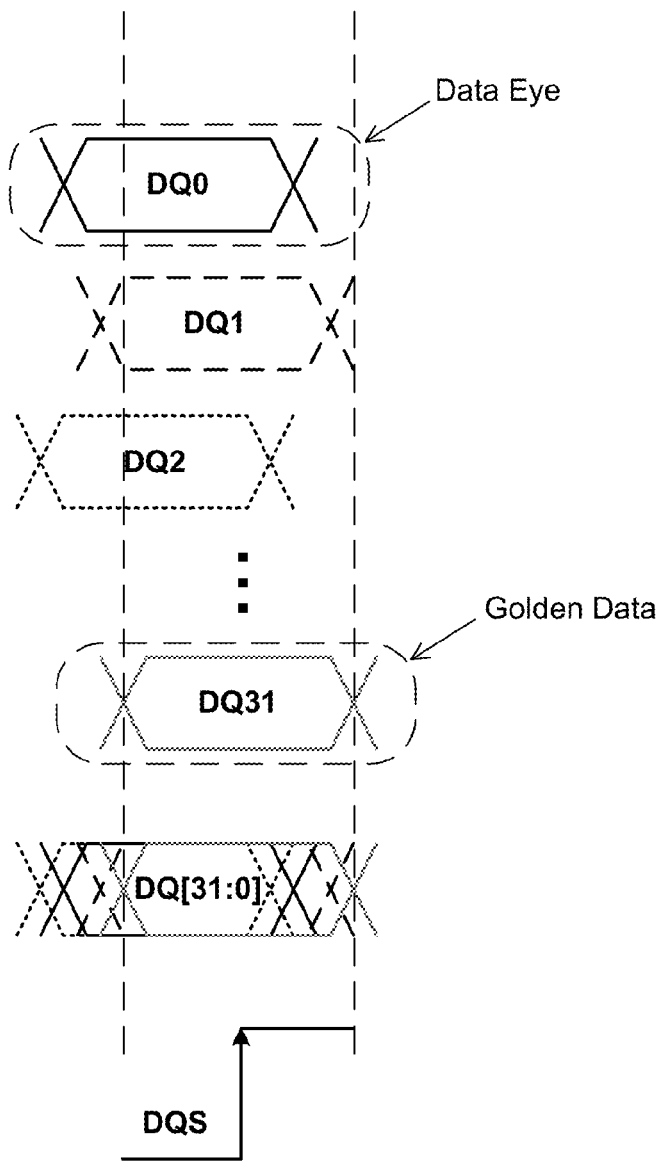

FIG. 1C illustrates a method of data alignment 100C between a 32-bit data signal DQ[31:0] and a data strobe DQS, comprising first (DQ0) through thirty-second (DQ31) bits which are superimposed to form the 32-bit data signal DQ[31:0]. The method of data alignment 100C first determines a golden bit DQ31 of the 32 bits DQ0-DQ31 within an IC architecture that has a maximum timing budget assumption, and aligns the data strobe (DQS) with a center of a data eye of the golden bit DQ31. As can be observed from FIG. 1C, while DQS is centered about DQ31, and thus has good alignment, other bits from a set of DQ0-DQ30 comprising the 32-bit data signal DQ[31:0] are not centered about DQS. As a result, the composite 32-bit data signal DQ[31:0] is not at an optimized point relative to DQS due to a misalignment between bits DQ0-DQ31. Other methods may alleviate this issue by employing optimization methods through complexity system protocols and hardware configurations such as delay lock loops (DLLs), which can add significant over head to IC design, timing analysis, manufacturing, etc.

Accordingly, the present disclosure relates to an interface comprising a memory controller and a memory unit coupled to the memory controller and configured to communicate with the memory controller through a first signal and a second signal. The interface further comprises a determination unit comprising judgment logic configured to send a control signal configured to align the first signal with the second signal. The memory controller further comprises a digitally-controlled delay line (DCDL) coupled to the determination unit and configured to receive the control signal, wherein the determination unit instructs the DCDL to adjust a delay of the first signal to align the first signal with the second signal. The memory controller further comprises a value register configured to store a signal delay value corresponding to alignment between the first signal and the second signal which is contained within the control signal. Other devices and methods are disclosed.

The disclosed interface and associated methods address timing variation and mismatch within 3D IC interface. Data strobe clocks are set to a position with maximum setup and hold margin, and aligned to the system clock for wide parallel bus data alignment. For interfaces comprising multiple memory units, a respective memory unit may be calibrated independently for nearly optimum alignment through a step-by-step training sequence. This disclosure provides a simple logic implementation on an analog front end for a robust relationship between data and clock without the need for additional hardware such as a DLL, complex memory read/write protocol behavior, or data generation and comparison.

Figure 2:
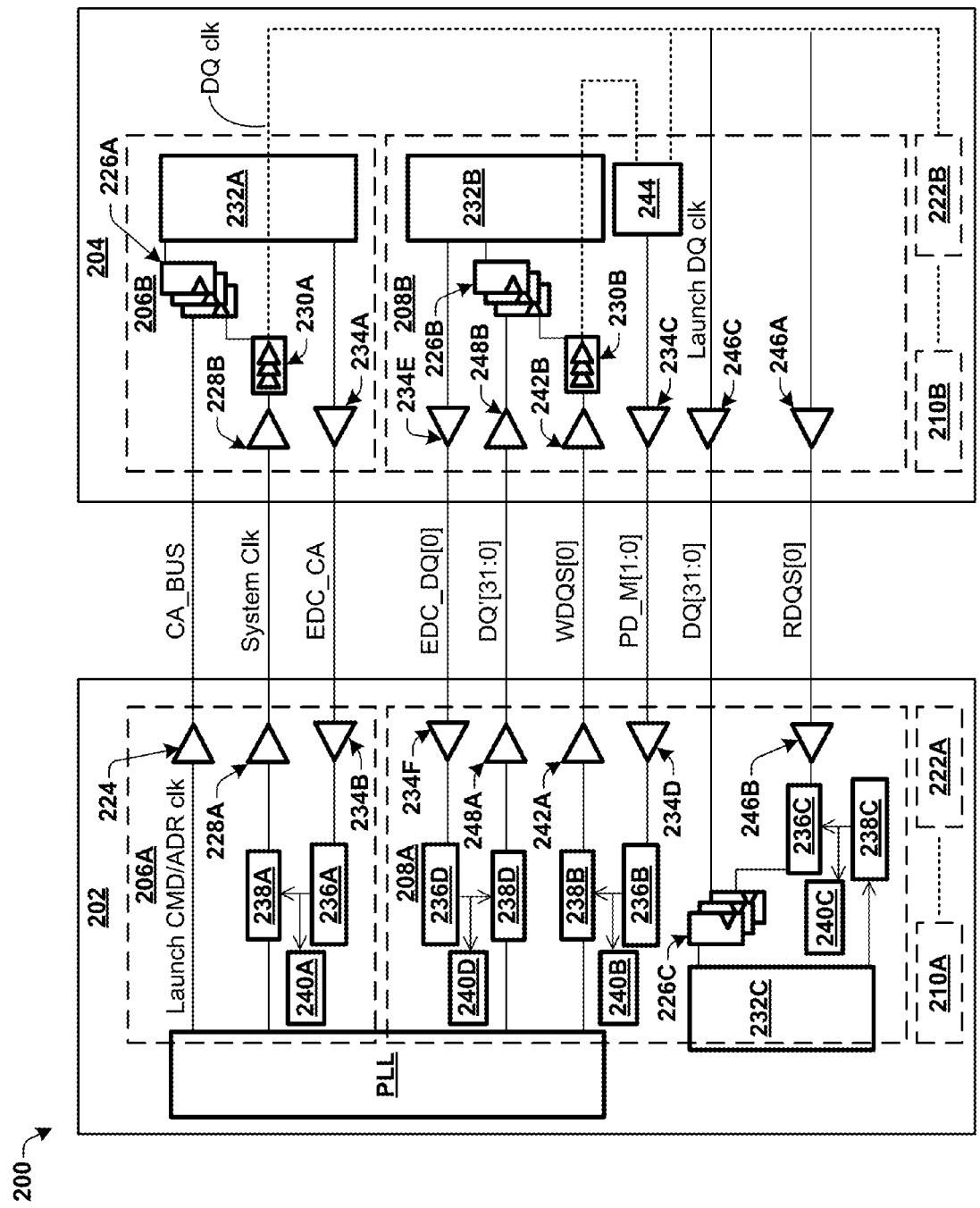
FIG. 2 illustrates a functional diagram of some embodiments of an interface between a memory controller and a DRAM.

FIG. 2 illustrates a functional diagram of some embodiments of an interface 200 between a memory controller interface 202 and a DRAM interface 204. Both the memory controller interface 202 and the DRAM interface 204 comprise different purpose blocks. The memory controller interface 202 comprises a command/address (CMD/ADR) control block 206A and eight data (DQ) control slices 208A-222A, wherein a respective DQ control slice 208A-222A comprises 32 DQ bits for a total of 256 DQ bits stored within the interface 200. Each DQ control slice 208A-222A further comprises an identical architecture. As such, only a DQ control slice 0 208A is shown to facilitate understanding. Likewise, the DRAM interface 204 comprises a CMD/ADR reception block 206B and eight DQ transceiver slices 208B-222B configured to transmit or receive a total of 256 DQ bits (i.e., 32 DQ bits per DQ transceiver slice 208B-222B). All blocks (206A-222A and 206B-222B) run off a system clock (clk). Read data DQ[31:0] read from the DRAM interface 204, and write data DQ'[31:0] written to the DRAM interface 204, are data strobe encoded. Data written to a respective DQ transceiver slice 208B-222B is accompanied by a write data strobe (WDQS) signal. Data read from a respective DQ transceiver slice 208B-222B is accompanied by a read data strobe (RDQS) signal. To insure robust communication between the memory controller interface 202 and the DRAM interface 204, CMD/ARD data, the system clk, DQ data (read or written), WDQS, RDQS, an optimized point of alignment between these signals is recognized for the interface 200.

Upon start-up of a system comprising the interface 200 the system enters CMD/ADR vs. system clk training. A CMD/ADR launch clk is sent directly on a CA_BUS from a CMD/ADR pin 224 of the memory controller interface 202, which is received by a first register 226A within the DRAM interface 204. The system clk is also sent from a first CK pin 228A within the memory controller interface 202 to a second CK pin 228B within the DRAM interface 204. When the DRAM interface 204 receives these signals they may not be well-aligned. To correct this, the system clk signal may be adjusted by the memory controller interface 202. To achieve this, the received system clk signal is buffered by a first buffer 230A, and used to sample the CA_BUS on the first register 226A. The sample result is sent to a first edge detect correction (EDC) logic block 232A. The first EDC logic block 232A determines the result of alignment between the system clk signal and the CA_BUS signal, and feeds back a first edge detect (EDC_CA) signal containing information about the result of alignment between the system clk and the CA_BUS signal from a first feedback pin 234A within the DRAM interface 204, across a first feedback channel, to a second feedback pin 234B within the memory controller interface 202. The EDC_CA signal is then sent to a first determination unit 236A which instructs a first digitally-controlled delay line (DCDL) 238A configured to adjust the system clk signal, which is resent to the DRAM interface 204 along with the CA_BUS signal. The first determination unit 236A further comprises first judgment logic configured to receive the EDC_CA signal and instruct the first DCDL 238A to tune the system clk signal to align with the CA_BUS signal though a first control signal, wherein the first control signal instructs the first DCDL 238A to adjust a delay of the system clk signal to align the system clk signal with the CA_BUS signal. A new EDC_CA signal is generated by the first EDC logic block 232A after tuning, which is again fed back to the first determination unit 236A. This process is repeated iteratively until the first EDC logic block 232A determines that alignment between the CA_BUS signal and system clk signal is nearly optimal. A system clk delay value corresponding to this alignment which is contained within the first control signal is then stored within a first value register 240A for reference. The system then exits CMD/ADR vs. system clk training.

Upon completion of CMD/ADR vs. system clk training, the interface 200 enters WDQS vs. system clk training to align the write data strobe (WDQS) with the system clk, because both signals are sent from the memory controller interface 202 to the DRAM interface 204 in write mode. The DQ control slice 0 208A comprises a second DCDL 238B configured to adjust a WDQS delay to align with the (fixed) system clk signal. The WDQS signal is sent from a first write strobe pin 242A within the memory controller interface 202 to a second write strobe pin 242B within the DRAM interface 204. The WDQS signal is sent to a phase detector (PD) 244, along with data clock (DQ clk) signal, which is derived from the system clk within the DRAM interface 204. The PD 244 is configured to determine a phase result PD_M[1:0] between the DQ clk signal (as well as the system clk signal) and the WDQS signal, and sends a PD_M[1:0] signal from a third feedback pin 234C located within the DQ transceiver slice 0 208B located within the DRAM interface 204, to a fourth feedback pin 234D located within DQ control slice 0 208A. The PD_M[1:0] signal is received by a second determination unit 236B which instructs a second DCDL 238B configured to adjust the system WDQS through a second control signal which instructs the second DCDL 238B to adjust a delay of the WDQS signal to align the WDQS signal with the system clk signal. Feedback between the PD 244 and the second DCDL 238B iteratively adjusts a delay of the WDQS signal to align with the system clk. A WDQS delay value corresponding to this alignment is then stored within a second value register 240B for reference, whereupon WDQS vs. system clk training is complete.

Upon completion of WDQS vs. system clk training, the system clk has been aligned to the CA_BUS signal, and the WDQS signal has been aligned to the system clk. The DRAM interface 204 utilizes the system clk signal (or DQ clk signal) to feed back a read data strobe (RDQS) signal to the memory controller interface 202 in read mode, and sends a RDQS signal from a first read pin 246A located within DQ transceiver slice 0 208B to a second read pin 246B located within DQ control slice 0 208A. As a result, the RDQS signal is fixed relative to the system clk signal (or DQ clk signal). The DRAM interface 204 also utilizes the system clk signal (or DQ clk signal) to generate the DQ[31:0] signal, which is sent from a third read pin 246C located within DQ control slice 0 208A, and is received by a third register 226C within the memory controller interface 202. For robust data transfer in read mode, the interface 200 enters RDQS vs. read DQ data training to align the RDQS signal with the DQ[31:0] signal. A third EDC logic block 232C receives result of DQ[31:0] sampled by delayed RDQS signal from the third register 226C and determines the result of alignment between RDQS signal and DQ[31:0] signal, and feeds back the edge detect signal about the result of alignment between RDQS signal and DQ[31:0] signal to a third determination unit 238C, which instructs a third DCDL 236C configured to adjust delay of the RDQS signal iteratively until the third EDC logic block 232C determines that alignment between the RDQS signal and DQ[31:0] signal is nearly optimal. An RDQS delay value corresponding to this alignment is then stored within a third value register 240C for reference, whereupon the interface 200 exits RDQS vs. read DQ data training.

For robust data transfer in write mode, the interface 200 enters WDQS vs. write DQ data training to align the WDQS signal with the DQ'[31:0] signal. In write mode the memory controller interface 202 sends the DQ'[31:0]] launch clk on a DQ'[31:0] BUS as DQ'[31:0] signal from a first write pin 248A located within DQ control slice 0 208A to a second write pin 248B located within the DQ transceiver slice 0 208B, which is received by a second register 226B, and sent to a second EDC logic block 232B. The WDQS signal is buffered by a second buffer 230B, and sent to the second EDC logic block 232B, which determines the result of alignment between the DQ'[31:0] and the WDQS signal. Because the WDQS signal was fixed in WDQS vs. system clk training, the DQ'[31:0] signal is adjusted for nearly optimal alignment. The second EDC logic block 232B feeds back a second edge detect (EDC_DQ[0]) signal between the WDQS signal and the DQ'[31:0] signal from a fifth to a feedback pin 234E within DQ transceiver slice 0 208B, across a second feedback channel, to a sixth feedback pin 234F within DQ control slice 0. The EDC_DQ[0] signal is then sent to a fourth determination unit 236D which instructs a fourth DCDL 238D configured to adjust the DQ'[31:0] launch clk through fourth judgment logic configured to send a fourth control signal configured to align the DQ'[31:0] signal with the WDQS signal. As with previous training methods this process repeats iteratively until the second EDC logic block 232B determines that alignment between the WDQS signal and the DQ'[31:0] signal is nearly optimal. A write data delay value corresponding to this alignment is then stored within a fourth value register 240D for reference. The interface 200 then exits WDQS vs. write DQ data training.

Figure 3:
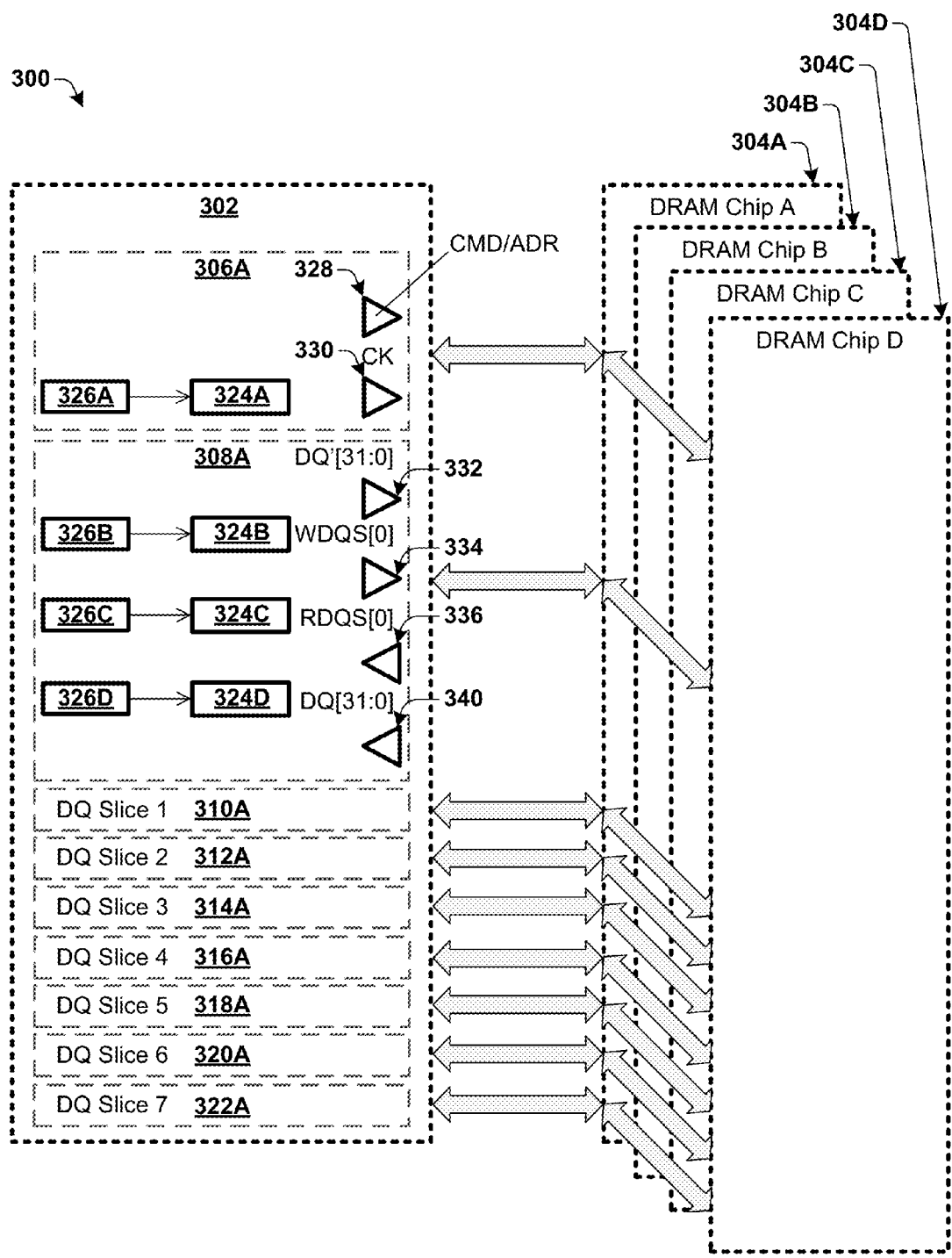
FIG. 3 illustrates a functional diagram of some embodiments of an interface between a memory controller and a plurality of DRAMs.

FIG. 3 illustrates a functional diagram of some embodiments of an interface 300 between a memory controller interface 302 and a plurality of DRAMs 304A-304D. The memory controller interface 302 further comprises a CMD/ADR control block 306A and eight identical DQ control slices 308A-322A. System clk control code configured to set a first delay value for a first DCDL 324A to adjust for a system clk signal relative to a CA_BUS signal of a respective DRAM 304A-304D is stored within a first value register 326A, wherein the system clk control code is further configured to adjust the system clk signal independently for a CA_BUS signal of a respective DRAM 304A-304D. Because any two DRAMs of the plurality of DRAM 304A-304D may have different timing constraints, the system clk control code is calibrated independently for each DRAM 304A-304D in a manner of the embodiments of FIG. 2, resulting in a plurality of system clk delay values, one for each respective DRAM 304A-304D. The system clk control code is further configured to switch between the system clk delay values, choosing a system clk delay value that corresponds to a respective DRAM 304A-304D, when communicating with the respective DRAM 304A-304D.

In a similar manner, the WDQS signal sent from a write strobe pin 334 is aligned to the system clk signal sent from a CK pin 330 within the memory controller interface 302, independently for each respective DRAM 304A-304D, wherein a plurality of second delay values for a second DCDL 324B are stored within a second value register 326B, one for each of the plurality of DRAMs 304A-304D. Analogously, an RDQS signal received a read strobe pin 336 is calibrated independently for alignment with a DQ[31:0] signal comprising read data and received by a read data pin 340 from a respective DRAM 304A-304D, through a plurality of third delay values for a third DCDL 324C and are stored within a third value register 326C, one for each of the plurality of DRAMs 304A-304D. Finally, the WDQS signal is aligned with a DQ'[31:0] signal comprising write data and sent from a write pin 332, wherein a plurality of fourth delay values for a fourth DCDL 324D are stored within a fourth value register 326D, one for each of the plurality of DRAMs 304A-304D.

Figure 4A:
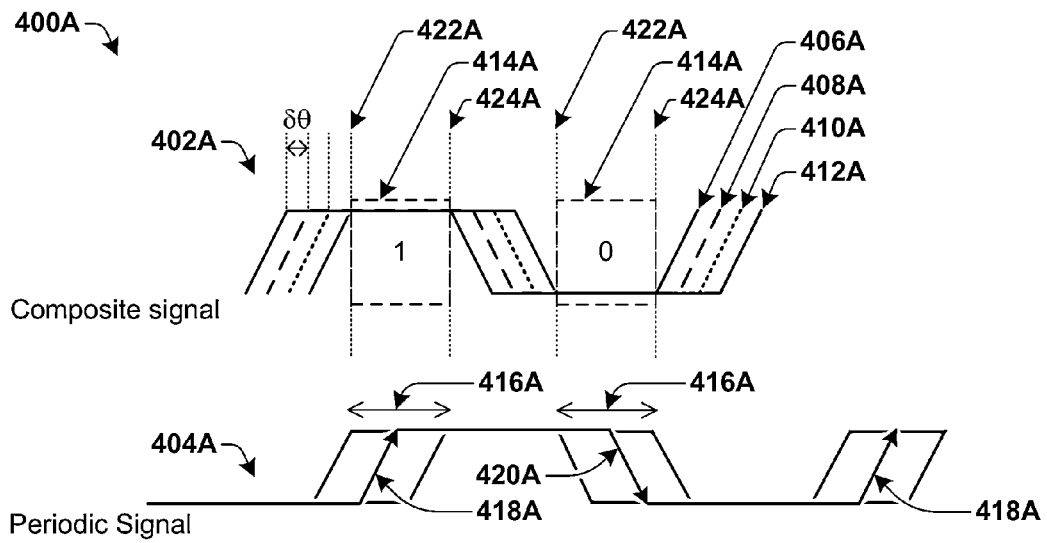
FIGS. 4A-4B illustrate some embodiments of pairwise data sampling alignment.

FIG. 4A illustrates some embodiments of pairwise data sampling alignment 400A between a composite signal 402A and a periodic signal 404A. The composite signal 402A comprises a plurality of independent periodic signals 406A-412A superimposed to form a multi-bit data signal. The composite signal 402A further comprises a common data eye 414A, wherein the plurality of independent periodic signals 406A-412A all obtain a same value (e.g., either "1" or "0"). For the embodiments of FIG. 4A the plurality of independent periodic signals 406A-412A comprise approximately equal periodicity and amplitude, and vary from one another primarily by a phase shift amount (80) resulting from one or more mismatch mechanisms comprising differing channel lengths, differing TSV variation for each channel, etc., within each channel wherein the plurality of independent periodic signals 406A-412A propagate.

To achieve nearly optimal alignment of the periodic signal 404A with the composite signal 402A, a delay 416A of the periodic signal 404A is tuned (i.e., moved left or right) relative to the composite signal 402A to align a rising edge 418A or a falling edge 420A of the of the periodic signal 404A with a center point of the common data eye 414A, wherein the center point is approximately the midpoint between a left edge 422A of the common data eye 414A and the right edge 424A of the common data eye. 414A.

For the embodiments of CMD/ADR vs. system clk training, the composite signal 402A comprises the CA_BUS signal and the periodic signal 404A comprises the system clk signal, as referenced in the embodiments of FIG. 2. The composite signal 402A and the periodic signal 404A are sent from the ASICs memory controller interface 202 to the DRAM interface 204. When the DRAM receives these signals they are misaligned. The first EDC logic block 232A produces the EDC_CA signal that informs the ASICs memory controller interface 202 of the degree of alignment. When the periodic signal 404A is tuned such that all signals of the plurality of independent periodic signals 406A-412A have a value of "1" at the rising edge 418A of the periodic signal 404A, and all signals of the plurality of independent periodic signals 406A-412A have a value of "0" at the a falling edge 420A of the periodic signal 404A, then the EDC_CA signal returns a value of "1." Otherwise the EDC_CA signal returns a value of "0." The ASICs memory controller interface 202 will continue to adjust the delay 416A of the periodic signal 404A until an EDC_CA value of "1" is achieved. Whereupon, the ASICs memory controller interface 202 will continue to adjust the delay 416A to determine left and right boundaries of the composite signal 402A in order to center the periodic signal 404A within the composite signal 402A.

For the embodiments of RDQS vs. read DQ data training, the composite signal 402A comprises the DQ[31:0] signal and the periodic signal 404A comprises the RDQS signal, as referenced in the embodiments of FIG. 2. Delay 416A of the periodic signal 404A is tuned by the ASICs memory controller interface 202 through utilization of the third EDC logic block 232C, which determines the degree of alignment between RDQS signal and DQ[31:0] signal, and feeds an internal EDC signal comprising information about the degree of alignment to the third determination unit 238C which instructs the third DCDL 236C to adjust the delay 416A. Analogous to the embodiments of CMD/ADR vs. system clk training, the internal EDC signal comprises a value of "1" when all signals of the plurality of independent periodic signals 406A-412A have a value of "1" at the rising edge 418A and all signals of the plurality of independent periodic signals 406A-412A have a value of "0" at the a falling edge 420A. Otherwise the internal EDC signal returns a value of "0." Once the EDC signal returns a value of "1" to the third determination unit 238C continues to tune the delay 416A to determine left and right boundaries of the composite signal 402A in order to center the periodic signal 404A within the composite signal 402A.

The embodiments of WDQS vs. write DQ data training are identical to the embodiments of CMD/ADR vs. system clk training, wherein the composite signal 402A comprises the DQ'[31:0] signal and the periodic signal 404A comprises the WDQS signal, as referenced in the embodiments of FIG. 2. The EDC_DQ[0] signal is constructed by the second EDC logic block 232B and analyzed by the fourth determination unit 236D for tuning of the DQ'[31:0] signal by the fourth DCDL 238D until an EDC_DQ[0] signal returns a value of "1." The DQ'[31:0] signal is then centered within the WDQS signal.

Figure 4B:
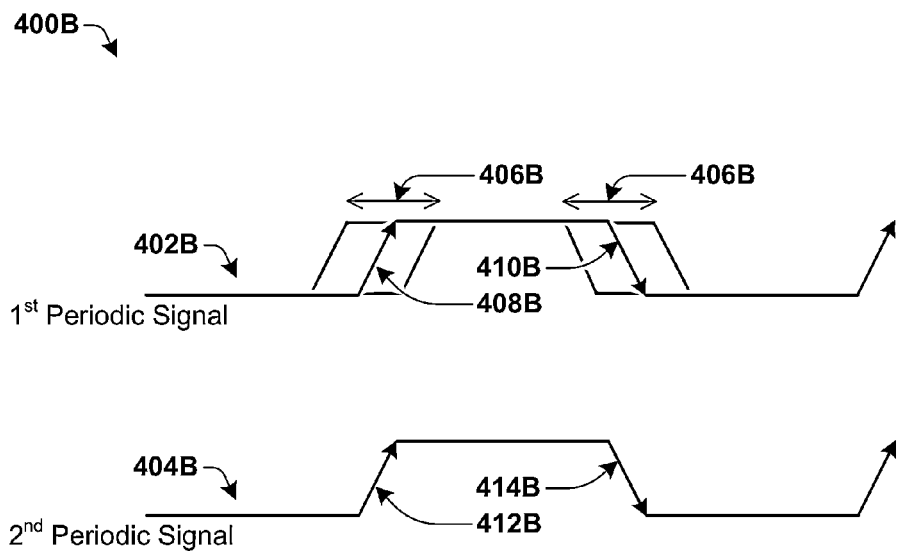

FIG. 4B illustrates some embodiments of pairwise data sampling alignment 400B between a first periodic signal 402B and a second periodic signal 404B. For the embodiments of FIG. 4B, the first periodic signal 402B comprises the WDQS signal and the second periodic signal 404B comprises the system clk signal, which undergo alignment in WDQS vs. system clk training as discussed in the embodiment of FIG. 2. A delay 406B of the WDQS signal is adjusted by the second DCDL 238B to align the WDQS signal with the (fixed) system clk signal. The PD 244 determines the phase difference PD_M[1:0] between the system clk signal and the WDQS signal, and sends a PD_M[1:0] signal to the second determination unit 236B which instructs the second DCDL 238B to adjust the WDQS signal. This process continues iteratively until a first rising edge 408B of the first periodic signal 402B aligns with a second rising edge 412B of the second periodic signal 404B, and similarly, until a first falling edge 410B of the first periodic signal 402B aligns with a second falling edge 414B of the second periodic signal 404B.

FIG. 4C illustrates some embodiments of write data strobe (WDQS) vs. system clock (clk) training 400C, comprising adjusting (tuning) a delay of the WDQS signal to align the WDQS signal with the clk signal. A phase lead and lag (lead/lag) between the WDQS signal and the clk signal is determined, and a delay of the WDQS start is adjusted until a stable phase lead with the clk signal established, wherein the stable phase lead comprises a rising WDQS edge that is outside a tuning range of a rising clk edge. The delay of the WDQS signal is further adjusted until a stable phase lag with the clk signal is established, wherein the stable phase lag comprises a falling WDQS edge that is outside a tuning range of a falling clk edge. A WDQS signal stable phase period is determined from the stable phase lead to the stable phase lag with the clk signal by means of target alignment. The delay of the WDQS signal start is adjusted from the stable phase lead with the clk signal. The delay of the WDQS signal is adjusted to get an unstable phase lead/lag result with the clk signal, wherein an unstable phase lead or lag comprises a rising or falling WDQS edge, respectively, that is outside within the tuning range of a rising or falling clk edge, respectively. The WDQS signal is adjusted until a stable phase lag to the clk signal is established. An unstable phase period of the WDQS signal is determined, and a mid-point of the unstable phase period means of target alignment.

Figure 5A:
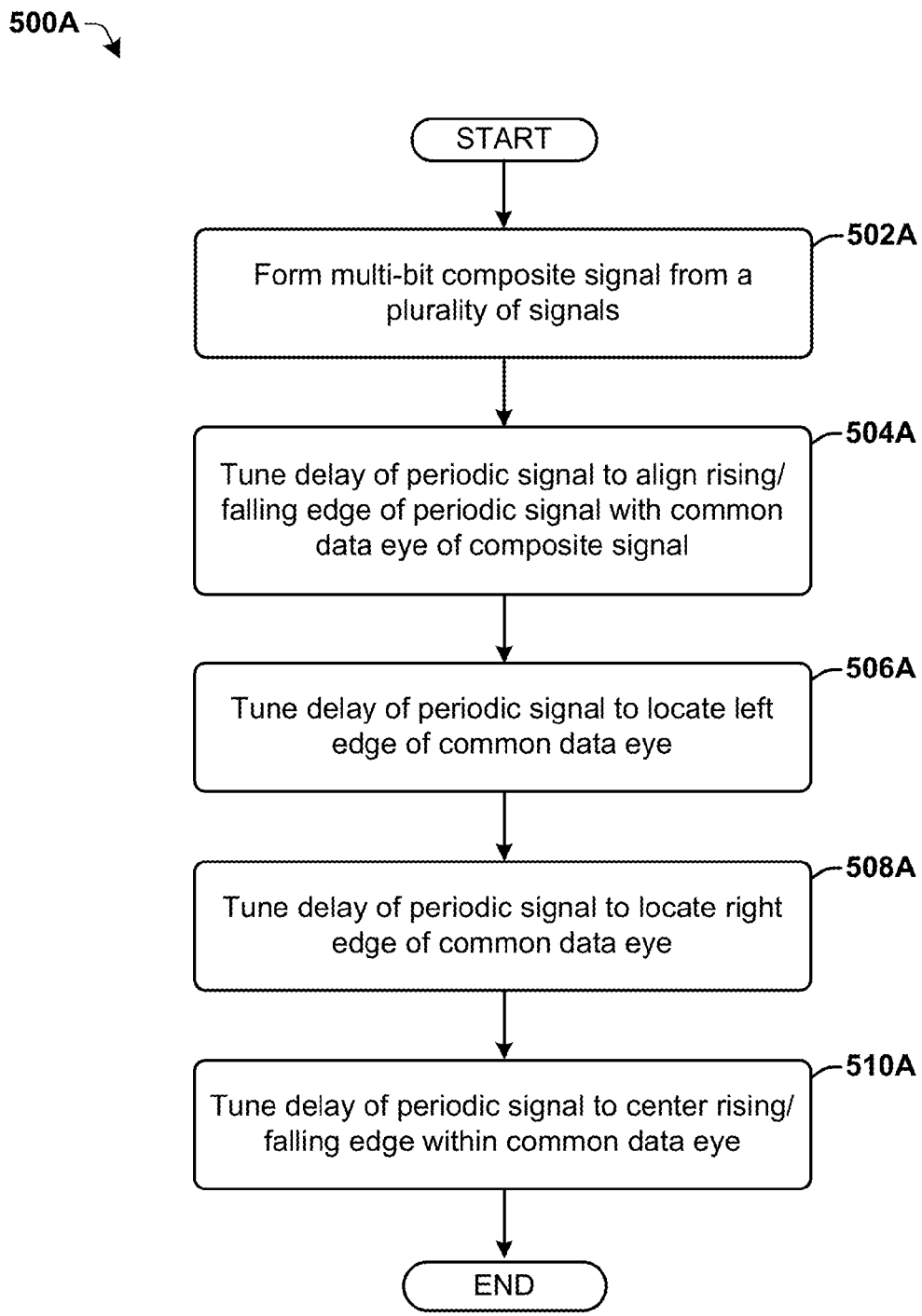
FIGS. 5A-5B illustrate some embodiments of methods of pairwise data sampling alignment.
Figure 5B:
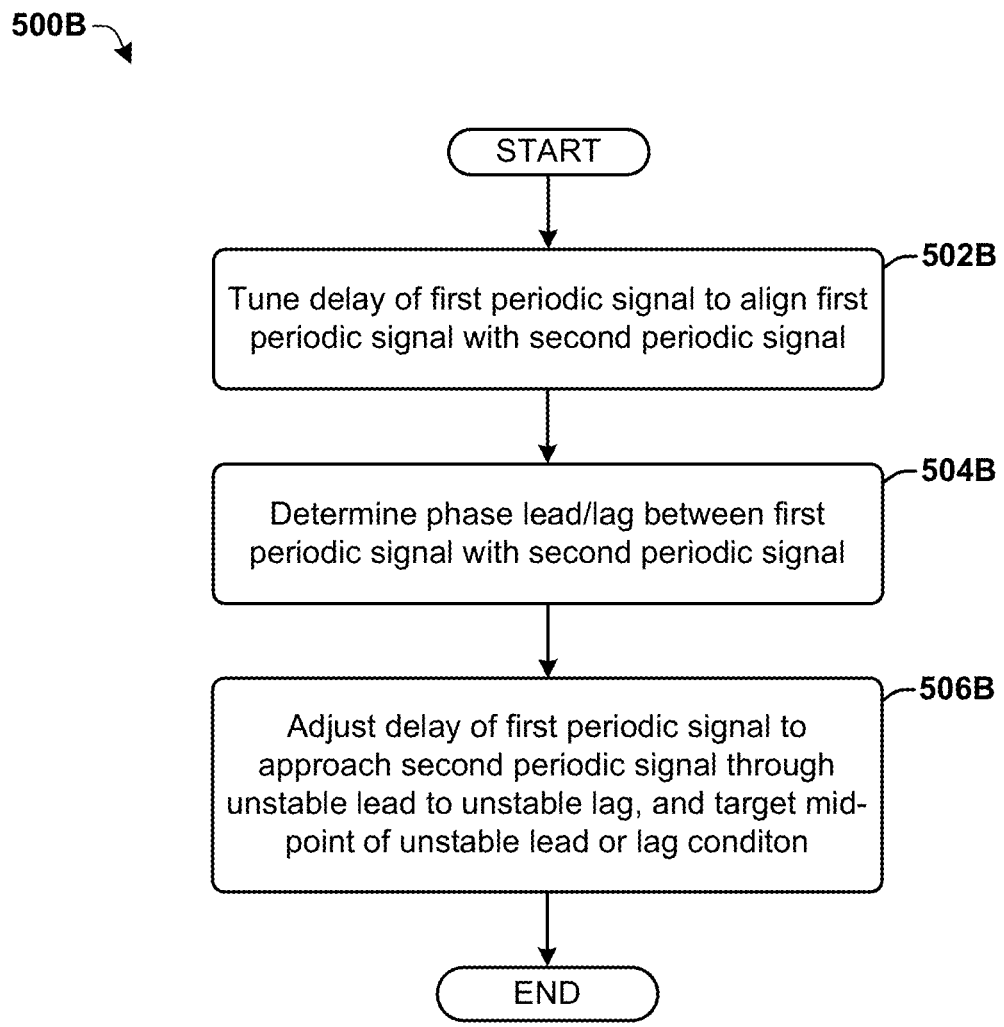
Figure 6:
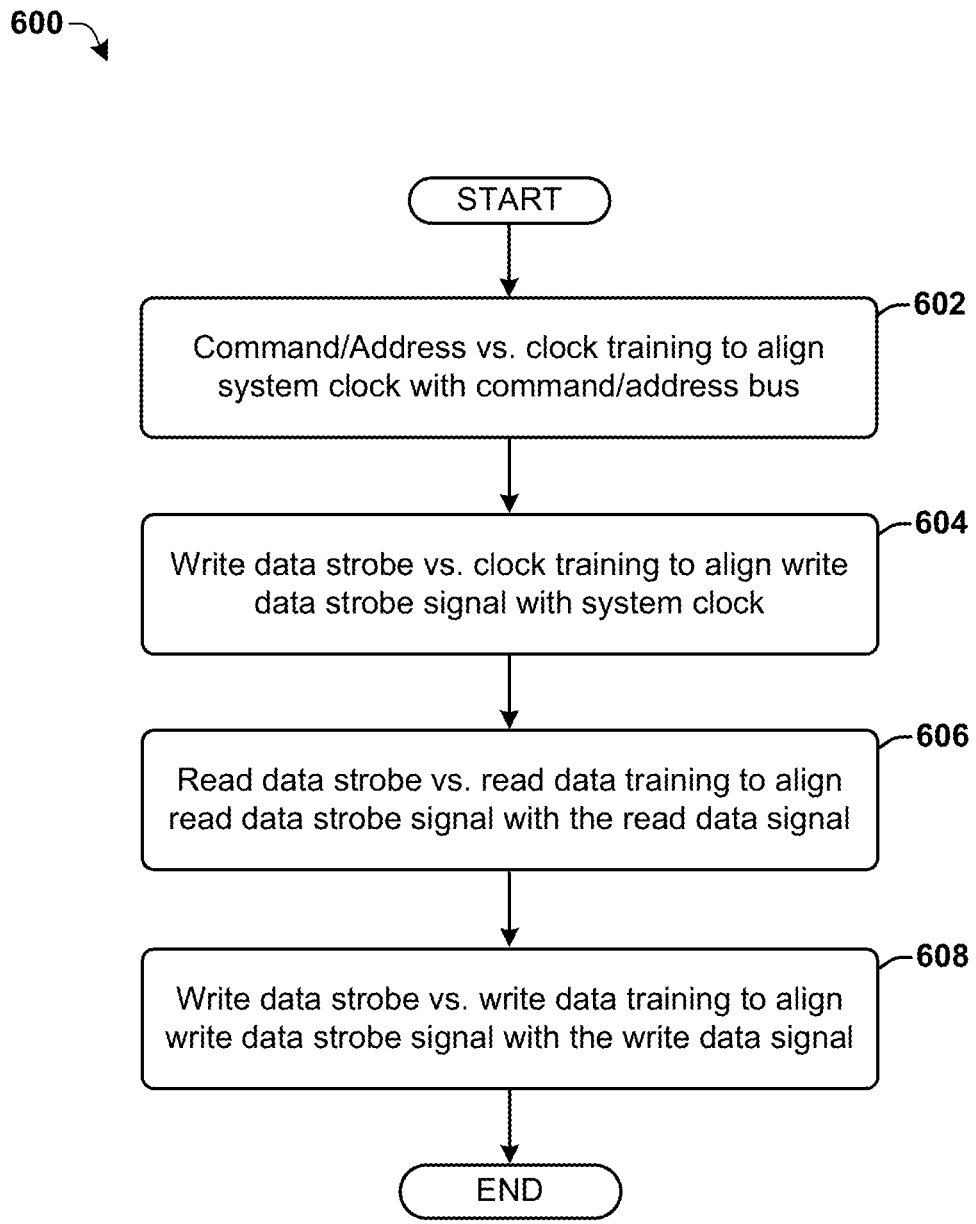
FIG. 6 illustrates some embodiments of a method of data sampling alignment between a memory controller and a DRAM.

FIGS. 5A-5B illustrate some embodiments of methods 500A-500B of pairwise data sampling alignment. FIG. 6 illustrates some embodiments of a method 600 of data sampling alignment between a memory controller and a DRAM. While methods 500A-500B, and 600 are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

FIG. 5A illustrates some embodiments of a method 500A of pairwise data sampling alignment between a composite signal and a periodic signal. In some embodiments, the composite signal further comprises a CA_BUS signal and the periodic signal comprises a system clk signal. In some embodiments, the composite signal further comprises multi-bit read or write data and the periodic signal comprises a RDQS signal or WDQS signal, respectively.

At 502A a composite signal comprising a plurality of independent periodic signals superimposed to form a multi-bit data signal. The composite signal further comprises a common data eye, wherein the plurality of independent periodic signals 406A-412A all obtain a same value (e.g., either "1" or "0").

At 504A a delay of the periodic signal is tuned relative to the composite signal to align a rising edge or a falling edge of the periodic signal with the common data eye.

At 506A the delay of the periodic signal is further tuned relative to the composite signal to locate a left edge of the common data eye.

At 508A the delay of the periodic signal is further tuned relative to the composite signal to locate a right edge of the common data eye.

At 510A the delay of the periodic signal is further tuned relative to the composite signal to center the rising edge or a falling edge of the periodic signal with the common data eye for nearly optimal sampling alignment.

FIG. 5B illustrates some embodiments of a method 500B of pairwise data sampling alignment between a first periodic signal and a second periodic signal. In some embodiments, the first periodic signal comprises a WDQS signal and the second periodic signal comprises a system clk signal.

At 502B a delay of the first periodic signal is adjusted to align the first periodic signal with the (fixed) second periodic signal.

At 504B a phase lead/lag result between the first periodic signal and the second periodic signal is determined.

At 506B the phase lead/lag is determined as a lead (i.e., the signal is periodic, so either condition may be chosen), and the delay on first periodic signal is adjusted to approach the second periodic signal. In the adjustment period, the phase detect result may go from a robust (i.e., stable) lead to an unstable lead or lag result, and then a stable lag result. The mid-point of the unstable lead or lag condition is the target on a first rising or falling edge of the first periodic signal aligns with a second rising or falling edge of the second periodic signal, respectively.

FIG. 6 illustrates some embodiments of a method 600 of data sampling alignment between a memory controller and a memory storage unit further comprising a DRAM.

At 602 the memory controller and the DRAM enter command/address vs. clock training to determine a nearly optimum sampling position by aligning a system clock with a command/address signal by centering rising and falling edges of the system clock within a common data eye of the command/address signal. Command/address vs. clock training determines the sampling position by locating left and right boundaries of the common data eye, and performs a linear search between the left and right boundaries to locate the center of the common data eye, whereupon the system clock signal is fixed relative to the command/address signal, and the command/address vs. clock training is complete.

At 604 the memory controller and the DRAM enter write data strobe vs. clock training to align write data strobe signal with the system clock signal by tuning the delay of the write data strobe signal to align it with the (fixed) system clock signal, whereupon a first rising or falling edge of the write data strobe signal is aligned with a second rising or falling edge of the system clock signal. Upon alignment the write data strobe vs. clock training is complete.

At 606 the memory controller and the DRAM enter read data strobe vs. read data training to align read data signal with the read data strobe signal by centering a common data eye of the read data signal about a rising edge or falling edge of the read data strobe signal, by performing a linear search between left and right boundaries of the read data strobe signal to locate the center of the common data eye relative to the read data strobe signal, whereupon the read data strobe vs. read data training is complete.

At 608 the memory controller and the DRAM enter write data strobe vs. write data training to align a write data signal with the write data strobe signal by centering a common data eye of the write data signal about a rising edge or a falling edge of the write data strobe signal, whereupon all training is complete.

It will also be appreciated that equivalent alterations and/or modifications may occur to one of ordinary skill in the art based upon a reading and/or understanding of the specification and annexed drawings. The disclosure herein includes all such modifications and alterations and is generally not intended to be limited thereby. In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein; such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

Therefore, the present disclosure relates to an interface comprising a memory controller and a memory unit coupled to the memory controller and configured to communicate with the memory controller through a first signal and a second signal. The interface further comprises a determination unit comprising judgment logic configured to send a control signal configured to align the first signal with the second signal. The memory controller further comprises a digitally-controlled delay line (DCDL) coupled to the determination unit and configured to receive the control signal, wherein the determination unit instructs the DCDL to adjust a delay of the first signal to align the first signal with the second signal. The memory controller further comprises a value register configured to store a signal delay value corresponding to alignment between the first signal and the second signal which is contained within the control signal.

In some embodiments, the present disclosure relates to an interface, comprising a memory controller interface further comprising a digitally-controlled delay line (DCDL), a memory unit interface coupled to the memory controller interface, and configured to communicate with the memory controller interface through a first signal and a second signal, and a determination unit comprising judgment logic configured to send a control signal configured to align the first signal with the second signal. In some embodiments the DCDL is coupled to the determination unit and configured to receive the control signal, wherein the determination instructs the DCDL to adjust a delay of the first signal to align the first signal with the second signal. In some embodiments the memory controller interface further comprises a value register configured to store a signal delay value corresponding to alignment between the first signal with the second signal which is contained within the control signal. In some embodiments the memory controller interface is coupled to a plurality of DRAMs, and the value register is further configured to store a unique signal delay value for a respective DRAM. In some embodiments the memory controller interface further comprises first signal control code configured to adjust the first signal independently for a respective DRAM. In some embodiments the interface further comprises an edge detect correction (EDC) logic block configured to determine a result of alignment between the first signal further comprising a superimposition of a plurality of independent periodic signals and the second signal further comprising a periodic signal, wherein the EDC logic block is further configured to feed back a first edge detect signal containing information about the result of alignment to the determination unit. In some embodiments the interface further comprises a phase detector (PD) configured to determine a phase lead/lag between the first signal further comprising a first periodic signal and the second signal further comprising a second periodic signal, wherein the PD is further configured to feed back a phase detect signal containing information about the phase lead/lag between the first signal and the second signal to the determination unit.

In some embodiments, the present disclosure relates to a memory interface comprising an application-specific integrated circuit (ASIC) memory controller interface comprising a command/address control block and a plurality of data control slices, wherein a respective data control slice comprises multi-bit data, and a dynamic random-access memory (DRAM) interface coupled to the memory controller interface, comprising a command/address reception block and plurality of data transceiver slices, wherein a respective data transceiver slice is configured to transmit or receive multiple data bits. The memory interface further comprises a first edge detect correction (EDC) logic block configured to determine a result of alignment between a system clock signal and a command/address signal, wherein the command/address signal is sent by the command/address control block and comprises address and command information for various components of the memory interface, and wherein the system clock signal is utilized by the memory controller interface to read the multi-bit data from the data control slice, and wherein the system clock signal is also utilized by the memory controller interface to write the multi-bit data to the data control slice.

In some embodiments, the present disclosure relates to a method of data sampling alignment between a memory controller and a memory storage unit, comprising centering a first rising edge or first falling edge of a system clock signal within a first common data eye of a command/address signal, aligning a write data strobe signal with the system clock signal by aligning a second rising edge or second falling edge of the write data strobe signal with the first rising edge or first falling edge of the system clock signal, respectively. The method of data sampling alignment further comprises centering a second common data eye of a read data signal about a third rising edge or third falling edge of a read data strobe signal, and centering a third common data eye of a write data signal about the second rising edge or second falling edge of the write data strobe signal.

What is claimed is:

1. An interface, comprising:
a memory controller interface comprising a digitally-controlled delay line (DCDL);
a memory unit interface coupled to the memory controller interface, and configured to communicate with the memory controller interface through a first signal and a second signal; and
a determination unit comprising judgment logic configured to send a digital code-to the DCDL, wherein the digital code is configured to change a delay imparted by the DCDL to the first signal to align the first signal with the second signal, and wherein the determination unit is implemented within an integrated circuit.

2. The interface of claim 1, wherein the memory controller interface further comprises a value register configured to store the digital code corresponding to alignment between the first signal and the second signal.

3. The interface of claim 1, further comprising an edge detect correction (EDC) logic block configured to determine a result of alignment between the first signal and the second signal, wherein the EDC logic block is further configured to feed back a first edge detect signal containing information about the result of alignment to the determination unit.

4. The interface of claim 1, further comprising a phase detector (PD) configured to determine a phase lead/lag between the first signal further comprising a first periodic signal and the second signal further comprising a second periodic signal wherein the PD is further configured to feed back a phase detect signal containing information about the phase lead/lag between the first signal and the second signal to the determination unit.

5. A memory interface, comprising:
an application-specific integrated circuit (ASIC) memory controller interface comprising a command/address control block and a plurality of data control slices, wherein a respective data control slice comprises multi-bit data;
a dynamic random-access memory (DRAM) interface coupled to the memory controller interface, comprising a command/address reception block and a plurality of data transceiver slices, wherein a respective data transceiver slice is configured to transmit or receive multiple data bits;
a first edge detect correction (EDC) logic block configured to determine a result of alignment between a system clock signal and a command/address signal;
wherein the command/address signal is sent by the command/address control block and comprises address and command information for various components of the memory controller interface; and
wherein the system clock signal is utilized by the memory controller interface to read the multi-bit data from the data control slice, and wherein the system clock signal is also utilized by the memory controller interface to write the multi-bit data to the data control slice.

6. The memory interface of claim 5, wherein the first EDC logic block is further configured to feed back a first edge detect signal containing information about the result of alignment between the system clock signal and the command/address signal to a first determination unit within the memory controller interface, the first determination unit comprising first judgment logic configured to send a first control signal configured to align the system clock signal with the command/address signal, wherein the first determination unit is implemented within the ASIC memory controller interface.

7. The memory interface of claim 6, wherein the memory controller interface further comprises a first digitally-controlled delay line (DCDL) coupled to the first determination unit and configured to receive the first control signal, wherein the first control signal instructs the first DCDL to adjust a delay of the system clock signal to align the system clock signal with the command/address signal.

8. The memory interface of claim 7, wherein the memory controller interface further comprises a first value register configured to store a system clock delay value corresponding to alignment between the system clock signal and the command/address signal.

9. The memory interface of claim 8, wherein the DRAM interface further comprises a phase detector (PD) configured to determine a phase lead/lag between a write data strobe (WDQS) signal and the system clock signal, wherein the PD is further configured to feed back a phase detect signal containing information about a phase lead/lag between the WDQS signal and the system clock signal to a second determination unit within the memory controller interface, wherein the second determination unit is implemented within the ASIC memory controller interface.

10. The memory interface of claim 9, wherein the memory controller interface further comprises:
a second DCDL coupled to the second determination unit and configured to receive a second control signal from the second determination unit, wherein the second control signal instructs the second DCDL to adjust a delay of the WDQS signal to align the WDQS signal with the system clock signal; and
a second value register configured to store a WDQS delay value corresponding to alignment between the WDQS signal and the system clock signal.

11. The memory interface of claim 10, wherein the DRAM interface further comprises a second EDC logic block configured to determine a result of alignment between a write data signal and the WDQS signal, wherein the second EDC logic block is further configured to feed back a second edge detect signal containing information about the result of alignment between the write data signal and the WDQS signal to a fourth determination unit within the memory controller interface, the fourth determination unit comprising fourth judgment logic configured to send a fourth control signal configured to align the write data signal with the WDQS signal, wherein the fourth determination unit is implemented within the ASIC memory controller interface.

12. The memory interface of claim 11, wherein the memory controller interface further comprises:
- a fourth DCDL coupled to the fourth determination unit and configured to receive the fourth control signal from the fourth determination unit, wherein the fourth control signal instructs the fourth DCDL to adjust a delay of the WDQS signal to align the WDQS signal with the write data signal; and
- a fourth value register configured to store a write data delay value corresponding to alignment between the WDQS signal and the write data signal.

13. The memory interface of claim 12, wherein the memory controller interface further comprises a third EDC logic block configured to determine the result of alignment between a read data signal and a read data strobe (RDQS) signal, wherein the third EDC logic block is further configured to feed back an internal EDC signal comprising information about the result of alignment between the read data signal and the RDQS signal to a third determination unit within the memory controller interface, the third determination unit comprising third judgment logic configured to send a third control signal configured to align the read data signal with the RDQS signal, wherein the third determination unit is implemented within the ASIC memory controller interface.

14. The memory interface of claim 13, wherein the memory controller interface further comprises:
- a third DCDL coupled to the third determination unit and configured to receive the third control signal from the third determination unit, wherein the third control signal instructs the third DCDL to adjust a delay of the RDQS signal to align the RDQS signal with the read data signal; and
- a third value register configured to store a read data delay value corresponding to alignment between the RDQS signal and the read data signal.

15. A method of data sampling alignment between a memory controller and a memory storage unit, comprising:
- centering a first rising edge or first falling edge of a system clock signal within a first common data eye of a command/address signal, wherein the command/address signal comprises address and command data for the memory storage unit;
- aligning a write data strobe (WDQS) signal with the system clock signal by aligning a second rising edge or second falling edge of the WDQS signal with the first rising edge or first falling edge of the system clock signal, respectively;
- centering a second common data eye of a read data signal about a third rising edge or third falling edge of a read data strobe (RDQS) signal; and
- centering a third common data eye of a write data signal about the second rising edge or second falling edge of the WDQS signal.

16. The method of claim 15, wherein aligning the WDQS signal with the system clock signal further comprises:
- adjusting a delay of the WDQS signal to align the WDQS signal with the system clock signal;
- determining a phase lead and phase lag between the WDQS signal and the system clock signal;
- adjusting a delay of a WDQS signal start until a stable phase lead with the system clock signal established, wherein the stable phase lead comprises a rising WDQS edge that is outside a tuning range of a rising clock edge;
- adjusting the delay of the WDQS signal until a stable phase lag with the system clock signal is established, wherein the stable phase lag comprises a falling WDQS edge that is outside a tuning range of a falling clock edge;
- determining a WDQS signal stable phase period from the stable phase lead to the stable phase lag with the system clock signal by means of target alignment;
- adjusting the delay of the WDQS signal start from the stable phase lead with the system clock signal;
- adjusting the delay of the WDQS signal to get an unstable phase lead and an unstable phase lag result with the system clock signal, wherein an unstable phase lead or unstable phase lag comprises a rising or falling WDQS edge, respectively, that is outside within the tuning range of a rising or falling clock edge, respectively;
- adjusting the delay of the WDQS signal until a stable phase lag to the system clock signal is established; and
- determining a WDQS signal unstable phase period, and a mid-point of the WDQS signal unstable phase period by means of target alignment.

17. The interface of claim 1, wherein the memory controller interface is coupled to a plurality of DRAMs and includes a plurality of value registers corresponding to the plurality of DRAMs, respectively, and wherein respective value registers are further configured to store respective digital codes corresponding to respective signal delay values for respective DRAMs.

18. The interface of claim 17, wherein the plurality of DRAMs are disposed on a plurality of dies, respectively, which are vertically stacked over one another.

19. The interface of claim 18, wherein the signal delay values are different as measured from the respective plurality of DRAMs to the memory controller interface, and wherein the respective digital codes are used to tune delays for a plurality of DCDLs coupled to the plurality of DRAMs, respectively, to limit the signal delay values.

20. The interface of claim 1, wherein the memory controller interface further comprises a command/address control block, and wherein the second signal is generated by the command/address control block and comprises address and command data for a memory storage unit of the memory unit interface.

* * * * *